(12) United States Patent
Mizrahi et al.

(10) Patent No.: US 8,611,352 B2
(45) Date of Patent: Dec. 17, 2013

(54) SYSTEM AND METHOD FOR ADAPTING A PACKET PROCESSING PIPELINE

(75) Inventors: Tal Mizrahi, Haifa (IL); Martin White, Sunnyvale, CA (US); David Melman, D.N. Bikat Beit Hakerem (IL)

(73) Assignee: Marvell World Trade Ltd., St. Michael (BB)

( * ) Notice: Subject to any disclaimer, the term of this patent is extended or adjusted under 35 U.S.C. 154(b) by 233 days.

(21) Appl. No.: 13/088,667

(22) Filed: Apr. 18, 2011

(65) Prior Publication Data

US 2011/0255540 A1 Oct. 20, 2011

Related U.S. Application Data

(60) Provisional application No. 61/326,124, filed on Apr. 20, 2010, provisional application No. 61/357,887, filed on Jun. 23, 2010.

(51) Int. Cl.
*H04L 12/28* (2006.01)
*H04J 3/16* (2006.01)

(52) U.S. Cl.
USPC .......................................... 370/392; 370/469

(58) Field of Classification Search
USPC .......................................... 370/389, 392, 469
See application file for complete search history.

(56) References Cited

U.S. PATENT DOCUMENTS

| | | | |
|---|---|---|---|
| 5,850,388 A * | 12/1998 | Anderson et al. | 370/252 |
| 6,687,732 B1 * | 2/2004 | Bector et al. | 709/200 |
| 6,886,103 B1 * | 4/2005 | Brustoloni et al. | 726/15 |
| 7,706,316 B1 * | 4/2010 | Kuik | 370/320 |
| 8,199,750 B1 * | 6/2012 | Schultz et al. | 370/389 |
| 2001/0009547 A1 * | 7/2001 | Jinzaki et al. | 370/390 |
| 2002/0073215 A1 * | 6/2002 | Huitema et al. | 709/230 |
| 2003/0084219 A1 * | 5/2003 | Yao et al. | 710/300 |
| 2003/0093540 A1 * | 5/2003 | Lioy | 709/230 |
| 2003/0144993 A1 * | 7/2003 | Kishigami | 707/3 |
| 2005/0120141 A1 * | 6/2005 | Zur et al. | 709/249 |
| 2008/0025308 A1 * | 1/2008 | Morgan et al. | 370/392 |
| 2008/0159277 A1 * | 7/2008 | Vobbilisetty et al. | 370/357 |
| 2008/0301134 A1 * | 12/2008 | Miller et al. | 707/6 |
| 2009/0059955 A1 * | 3/2009 | Georgiou et al. | 370/466 |
| 2009/0086725 A1 * | 4/2009 | Lai et al. | 370/352 |
| 2009/0193114 A1 * | 7/2009 | Dick et al. | 709/224 |
| 2011/0080916 A1 * | 4/2011 | Davies et al. | 370/401 |

OTHER PUBLICATIONS

U.S. Appl. No. 61/430,413, filed Jan. 6, 2011.
U.S. Appl. No. 61/466,718, filed Jan. 23, 2011.
U.S. Appl. No. 12/938,116, filed Nov. 2, 2010.

* cited by examiner

*Primary Examiner* — Dang T Ton
*Assistant Examiner* — Ryan Kavleski

(57) ABSTRACT

An apparatus for forwarding packets includes a packet processing pipeline having a processing unit that processes packets compliant with a recognized communication protocol. A first port coupled to the packet processing pipeline is configured to receive a packet that does not comply with the recognized communication protocol and has a header that conforms to a second communication protocol. A data extraction unit extracts first destination information from the header of the packet and, based on the first destination information, generates second destination information that conforms to the recognized communication protocol. The processing unit determines, based on the second destination information, an egress interface to which the packet is to be forwarded.

22 Claims, 11 Drawing Sheets

US 8,611,352 B2

SYSTEM AND METHOD FOR ADAPTING A PACKET PROCESSING PIPELINE

CROSS-REFERENCE TO RELATED APPLICATIONS

This application claims the benefit of U.S. Provisional Patent Application Nos. 61/326,124. entitled "System and Method for Forwarding in a Fiber Channel Over Ethernet," filed on Apr. 20, 2010, and 61/357,887, entitled "System and Method for Forwarding in a Fiber Channel Over Ethernet," filed on Jun. 23, 2010, the entire disclosures of which are hereby incorporated by reference herein.

FIELD OF TECHNOLOGY

The present invention relates generally to communication networks and, more particularly, to a network device and methods that support emerging network protocols such as Fibre Channel over Ethernet protocols.

BACKGROUND

Network devices, such as bridges and routers, sometimes are implemented using a pipelined hardware architecture in which the different unites of a processing pipeline recognize and process network packets that are consistent with different protocols. For example, a pipeline in a network device may process packets received by the device and then forward the packets to appropriate egress ports of the device. The packets may be forwarded to one or more egress ports of the device according to a forwarding decision, which may be based on one or more fields of one or more headers present within the frame. Because of their pipelined architecture, such network devices may be very efficient for processing packets that are compliant with a recognized communications protocol. However, whenever a new protocol is developed, existing units of the processing pipeline may not recognize packets that are compliant with the new protocol. The adoption of a new protocol may require the addition of a new processing unit to the pipeline. In an example, a network switch having a conventional pipelined architecture may not be capable of forwarding data packets that are compliant with emerging protocols such as Fibre Channel Over Ethernet (FCoE) communications protocols.

SUMMARY

In an embodiment, a method for forwarding packets comprises implementing a packet processing pipeline having a plurality of packet processing units for processing packets that are compliant with a recognized communication protocol. The method also comprises implementing in the packet processing pipeline an adapted processing unit configured to process packets that are compliant with an unrecognized communication protocol. Additionally, the method comprises receiving at a port coupled to the packet processing pipeline a packet that is compliant with the unrecognized communication protocol, the packet including an unrecognized header. Further, the method comprises extracting from the unrecognized header first destination information that is compliant with the unrecognized communication protocol, and generating, based on the extract first destination information, second destination information that is consistent with a protocol supported by at least one of the processing units for determining an egress interface to which the packet is to be forwarded. Still further, the method comprises determining the egress interface for the packet using at least one of the processing units, and forwarding the packet to a particular physical egress port associated with the determined egress interface.

In another embodiment, an apparatus comprises a packet processing pipeline having a processing unit for processing packets that are compliant with a recognized communication protocol. The apparatus also comprises a first port coupled to the packet processing pipeline and configured to receive a packet that is not compliant with the recognized communication protocol, the packet having a packet header conforming to a second communication protocol. Further, the apparatus includes a data extraction unit configured to extract first destination information from the header of the packet and to generate, based on the extracted first destination information, second destination information that conforms to the recognized communication protocol, wherein the processing unit determines, based on the second destination information, an egress interface to which the packet is to be forwarded. Still further, the apparatus comprises a second port associated with the determined egress interface.

DETAILED DESCRIPTION

Figure 1:
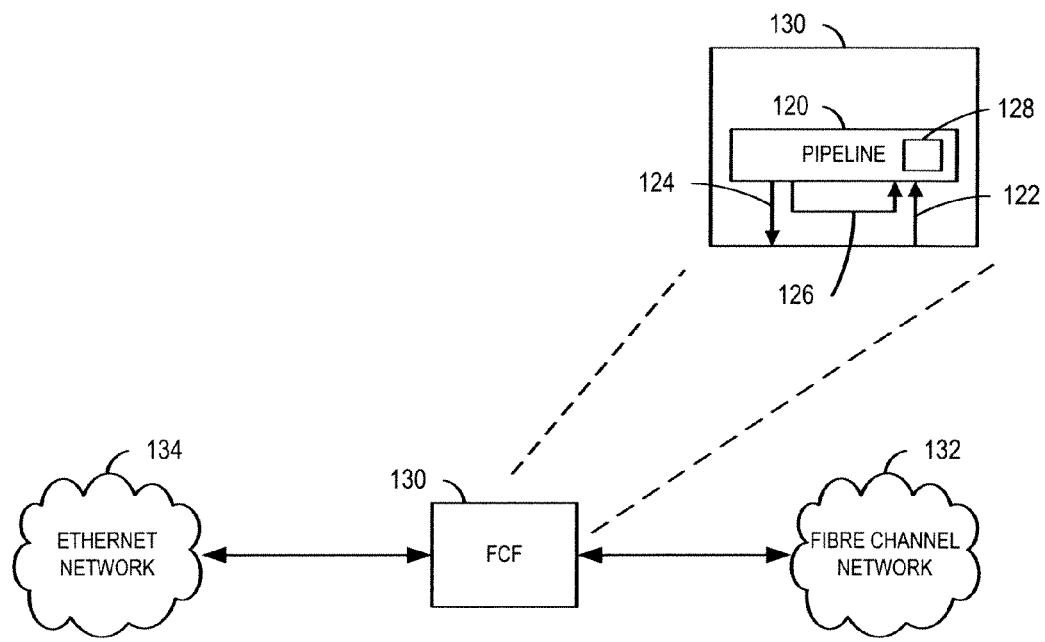
FIG. 1 is a diagram illustrating a network forwarding device configured to connect a network compliant with a previously unsupported protocol to an Ethernet network.

Embodiments such as the embodiments disclosed herein may have utility in the field of network switches such as Ethernet switches. For instance, an example switch will be described that may be employed in various network applications and architectures that support virtual networking strategies such as virtual LAN (VLAN), virtual private network (VPN), and virtual private LAN service (VPLS) technologies. While the following description addresses specific embodiments in which the subject apparatus and methods are described with respect to a device communicatively coupling an Ethernet network to a Fibre Channel network, the present disclosure is not intended to be limited in that regard. In particular, other embodiments may have utility in other applications in which a packet is transmitted using a communication protocol that legacy packet processing pipelines do not recognize. It is noted that the systems and methods set forth herein are not limited to any particular network architecture or topography.

The apparatus and methods disclosed herein employ existing processing units in a packet processing pipeline to make forwarding decisions for packets that the pipeline would not ordinarily recognize. Specifically, a packet conforming to a communication protocol may be received in one or more processing units of a packet processing pipeline, which pipeline was neither designed nor programmed to recognize or process packets conforming to that protocol. Information in the header of the packet is extracted and used to generate information, recognizable to a processing unit in the packet processing pipeline, that will cause the processing unit to make a forwarding decision compliant with the previously unrecognized protocol. This concept is specifically described below with respect to a particular implementation in which the protocol is Fibre Channel over Ethernet (FCoE). However, it is expressly noted that the concept is applicable to adapt various existing hardware pipelines to accommodate various emerging protocols, without adding additional, dedicated processing units to the existing pipelines.

The Fibre Channel protocol was originally developed for use with optical cabling and in storage area networks (SANs). Fibre Channel uses a five-layer stack differing from the OSI seven-layer model implemented in other standards such as Ethernet. With the proliferation of high speed Ethernet networks (e.g., 10 Gigabit Ethernet networks and faster), storage area networks no longer require the use of optical fibers to transmit data at high speeds.

Fibre Channel over Ethernet (FCoE) is a standard that allows IP and SAN data traffic to be consolidated onto one network by encapsulating Fibre Channel frames (the term "frame" is used interchangeably herein with the term "packet") for Ethernet networks. Specifically, FCoE replaces the lowest two layers of the FC stack (FC0 and FC1) with Ethernet, allowing FC traffic to flow, over Ethernet, alongside traditional Ineternet Protocol (IP) traffic. That is, the FC frame is encapsulated in a standard Ethernet frame with a dedicated Ethertype (0x8906). An FC frame encapsulated for transmission over Ethernet is an FCoE frame. FCoE is part of the INCITS T11 FC-BB-5 standard.

FIG. 1 is a diagram illustrating a FCoE forwarder (FCF) 130 connecting a Fibre Channel (FC) network 132 and an Ethernet network 134. The FCF 130 is a switch incorporating a packet processing pipeline 120 that processes packets received via one or more ingress ports 122 and forwards the packets to appropriate ones of one or more egress ports 124. The packet processing pipeline 120 is configured, in an embodiment, to process multi-headed packets in one or more passes. For example, in a first pass, the packet processing pipeline 120 may process an encapsulated or multi-headed packet by, for example, analyzing the encapsulating header. Then, the multi-headed packet is provided back to an ingress portion of the pipeline 120, before or after stripping the encapsulating header. In a second pass, the inner packet is processed by, for example, analyzing the header of the inner packet. To facilitate processing the packet in such a manner, the FCF 130 optionally may include an internal loopback port 126. For example, after the first pass, the encapsulated packet (or only the inner packet) may be provided to the ingress portion of the pipeline via the internal loopback port 126. It is noted however, that in some embodiments, processing proceeds in a single pass, however such single path processing may require additional and/or replicated processing units.

In an embodiment, the hardware processing pipeline 120 includes one or more hardware processor units. By implementing the hardware processing units (as described below with reference to FIG. 3), the packet processing pipeline 120 is operable to forward traffic received by the FCF 130 according to protocols (e.g., Ethernet, IP, etc.) implemented by the processing units. The hardware nature of the processing units renders it difficult to adapt the processing pipeline 120 to be compatible with emerging protocols uncontemplated at the time the processing units were designed. However, by manipulating a packet descriptor associated with a packet that conforms to an emerging protocol, the hardware processing units and, therefore, the processing pipeline 120 may be adapted to forward packets that, when encountered, would otherwise be unrecognized and/or unprocessable by the processing pipeline 120. Specifically, the packet descriptor may be manipulated such that it appears to one or more of the processing units as if to conform to a protocol implemented by the one or more processing units.

For example, within the FC network 132, traffic is generally Fibre Channel traffic (i.e., packets adhering to the Fibre Channel protocol, which may have been uncontemplated when the processing units and/or the processing pipeline 120 was designed). Before being transmitted over an Ethernet network, such as the Ethernet network 134, which, in an embodiment is an Ethernet network, Fibre Channel packets are encapsulated in an FCoE packet, by adding an FCoE header and an Ethernet header. The processing pipeline 120 and, in particular, the processing units therein, may not recognize the FCoE packet. However, the packet descriptor associated with the FCoE packet may be manipulated as it passes through the processing pipeline 120 such that a processing unit of the processing pipeline 120 makes a forwarding decision on the FCoE packet consistent with the FCoE protocol.

The descriptor may be manipulated by a descriptor modification unit 128, that extracts destination information from the packet (e.g., the FCoE packet) and generates new destination information that, when placed in a suitable packet descriptor, conforms to a protocol expected by a processing unit in the processing pipeline 120. The descriptor modification unit 128 may be a unit, module, or routine operating inside a processing unit of the processing pipeline 120, may be a separate unit, module, or routine operating in the processing pipeline 120, or may be implemented by and between multiple processing units in the processing pipeline 120. Alternatively, the descriptor modification unit 128 may be separate from (but integrated into) the processing pipeline 120, as described in U.S. provisional patent applications 61/430,413, filed Jan. 6, 2011, and 61/466,718, filed Jan. 23, 2011, each of which is hereby incorporated by reference herein.

Figure 2:
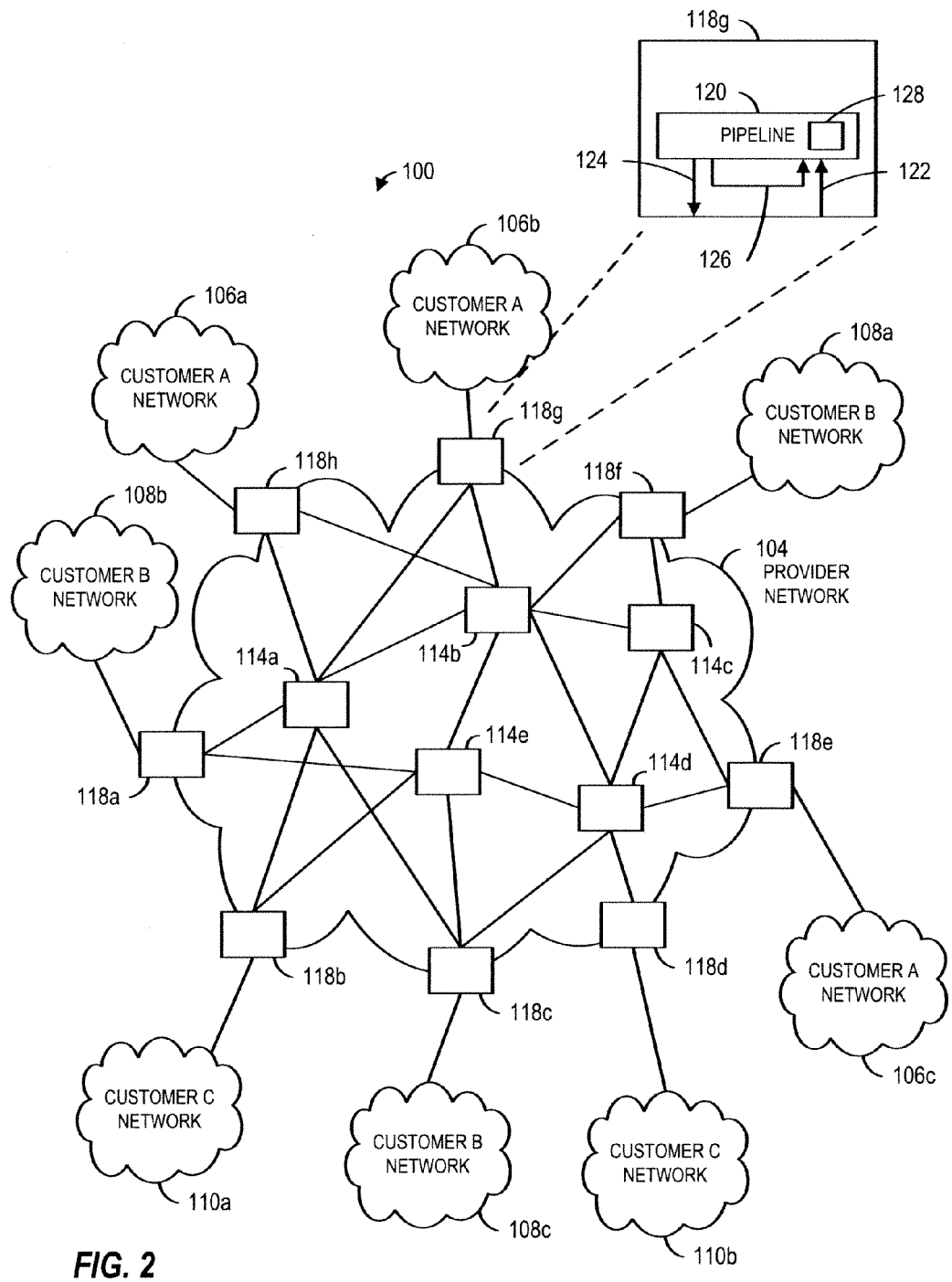
FIG. 2 is a block diagram of a communication network including a provider network that communicatively couples a plurality of customer networks.

FIG. 2 is block diagram of a network 100 including a provider network 104, a plurality of networks 106 of a customer A, a plurality of networks 108 of a customer B, and a plurality of networks 110 of a customer C. In an embodiment, the provider network 104 is a corporate LAN or a corporate wide area network (WAN), and the customer networks 106, 108, 110 are portions of the corporate network. The provider network 104 includes a plurality of switches 118, which may route packets between devices in the network 100. A portion of one or more of the customer networks 106 is implemented as a Fibre Channel network, in an embodiment. Additionally, a portion of one or more of the customer networks 106 is implemented as an Ethernet network. Each of the switches 118 may include a packet processing pipeline such as the packet processing pipeline 120.

Figure 3:
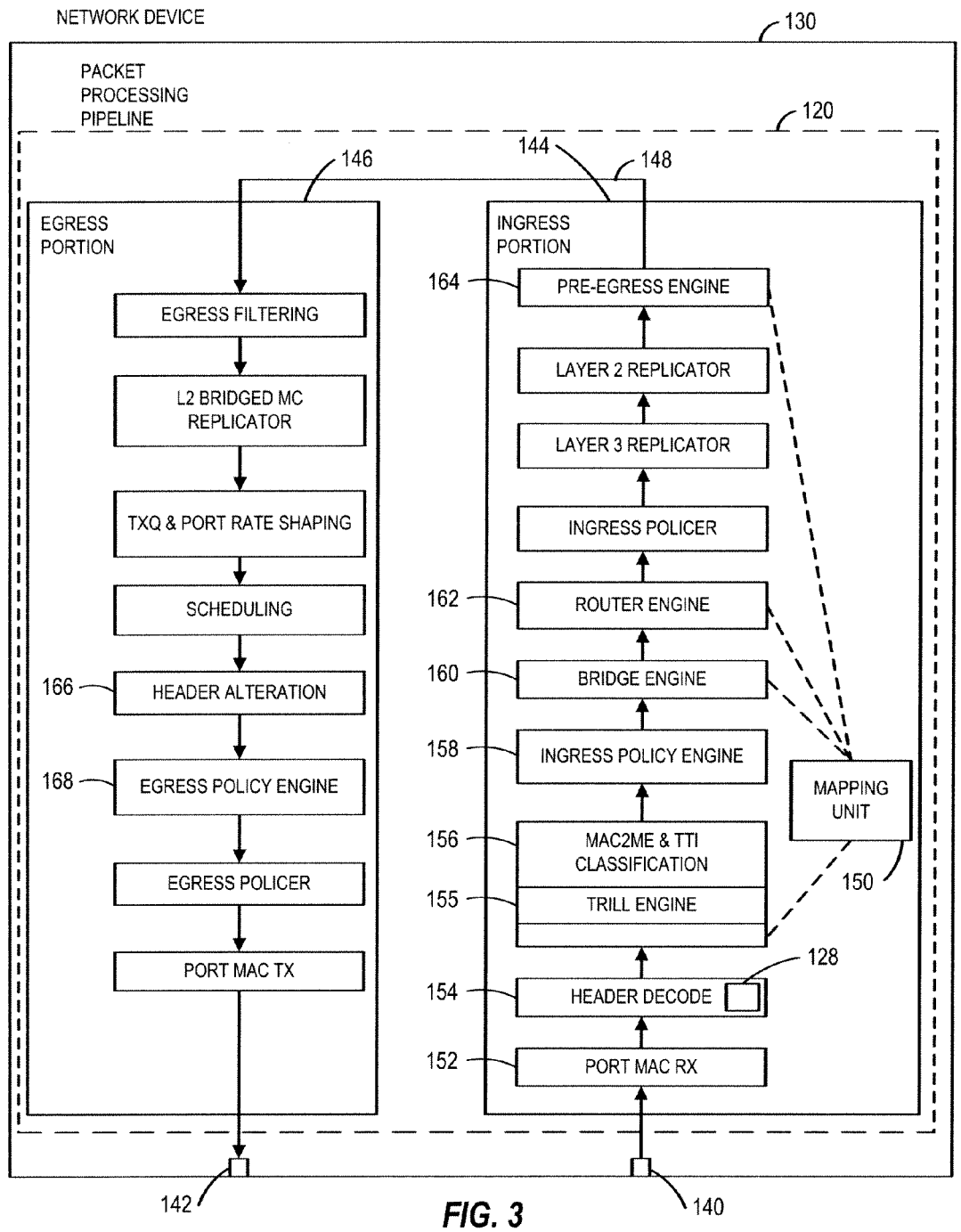
FIG. 3 is a block diagram illustrating an embodiment of an adapted packet processing pipeline configured to forward FCoE packets in accordance with an embodiment of the network forwarding device of FIG. 1.

Referring now to FIG. 3, the FCF network device 130 and, in particular, the packet processing pipeline 120, is depicted in greater detail. In FIG. 3, the FCF 130 is configured to process and forward data packets and, in particular, is configured to forward FCoE data packets, in an embodiment. The apparatus depicted in FIG. 3 includes Layer-3 forwarding capabilities and Layer-2 forwarding capabilities and, accordingly, is referred to as a router. The FCF 130 may be utilized in a provider network such as the example provider network 104 of FIG. 2. In an embodiment, the FCF 130 includes an internal loopback port 126 (FIG. 1) to facilitate processing of multi-headed or hierarchically headed packets. Upon receiving a multi-headed packet, the FCF 130 generally processes the multi-headed packet in the packet processing pipeline 120 by analyzing an external or encapsulating header. The FCF 130 then forwards the multi-headed packet back into the provider network and/or feeds the multi-headed packet back to the packet processing pipeline 120 via the internal loopback port 126, and the pipeline 120 then strips the encapsulating header from the multi-headed packet, leaving the inner packet. Next, the pipeline 120 processes the inner packet and forwards the inner packet to the customer network when appropriate.

The packet processing pipeline 120 of the FCF 130 is coupled to one or more ingress physical ports 140 and to one or more egress physical ports 142. The packet processing pipeline 120 maps a packet to an egress port, which may be a single egress physical port 142 or an aggregate of several physical or logical ports. Accordingly, the egress port may be referred to, more generally, as an egress interface. The packet processing pipeline 120 includes an ingress portion 144 and an egress portion 146 coupled together via a fabric interface 148, in an embodiment. Optionally, the FCF 130 may be coupled to other switches (not shown) via the fabric interface 148. The other switches may be components of one or more switches, and the ingress portion 144 may forward packets to egress portions 146 of other pipelines 120 of other switches via the fabric interface 148. Similarly, the egress portion 146 may receive packets from ingress portions 144 of other router units via the fabric interface 148. Although the fabric interface 148 is illustrated as being included in the FCF 130, the fabric interface 148 may be at least partially external to the FCF 130. For example, a plurality of switches, including the FCF 130, may be implemented on a plurality of respective integrated circuits (ICs), and the fabric interface 148 may be at least partially external to the plurality of ICs. Optionally, the fabric interface 148 may be omitted or simplified so that the ingress portion 144 is only capable of forwarding packets to egress portions 146 in the FCF 130, as opposed to forwarding packets to egress portions 146 external to the FCF 130. If the fabric interface 148 is omitted, the ingress portion 144 may be coupled directly to the egress portion 146.

As shown in FIG. 3, the ingress portion 144 and the egress portion 146 each include one or more packet processing units coupled in series. Generally, each unit of the pipeline 120 optionally processes a packet or a packet descriptor corresponding to information therein and passes the packet or the packet descriptor to the next unit in the pipeline 120. In an embodiment, a packet descriptor includes some information from the packet, such as some or all of the header information of the packet, and may be prepared for a particular processing unit based on the requirements of that unit. The packet descriptor may include other information as well such as an indicator of where the packet is stored in a memory associated with the FCF 130. For ease of explanation, the term "packet" hereinafter may be used to refer to a packet itself or to a packet descriptor associated with the packet. Each unit may or may not process a particular packet. For example, in some instances, a unit may simply forward a packet onto the next unit in the pipeline 120. The last unit of the ingress portion 144 may pass the packet to the first unit of the egress portion 146 via the fabric interface 148.

In an embodiment, each or at least some of the units of the ingress portion 144 and the egress portion 146 includes, or otherwise is associated with, a corresponding memory. Packets received by a unit are stored in the memory associated with the unit, in an embodiment. In some embodiments, multiple units are associated with an individual memory.

In an embodiment, the FCF 130 is configured to utilize extended ports (eports) and extended virtual local area networks (eVLANs) when processing and forwarding packets, as described in U.S. patent application Ser. No. 12/938,116, entitled "Switching Apparatus and method Based on Virtual Interfaces," the entirety of which is hereby incorporated by reference herein.

In one embodiment, a plurality of switches, including the FCF 130, are implemented on a plurality of respective integrated circuits (ICs). In some other embodiments, the FCF 130 and one or more other switches in the plurality of switches are implemented on a single IC. In one such embodiment, the FCF 130 is coupled to one or more other switches in the plurality of switches via one or more corresponding cascade ports.

As described above, the ingress physical ports 140 and the egress physical ports 142 are coupled to a plurality of different networks and to other switches in the switching system, in some embodiments. For example, the ingress physical ports 140 and the egress physical ports 142 are coupled to the provider network 104, to one or more of the customer networks 106, 108, 110, and/or to one or more other switches in the switching system, in various embodiments. For purposes of clarity, only one ingress physical port 140 and one egress physical port 142 are depicted in FIG. 3. In an embodiment the packet processing pipeline 120 is coupled to, and configured to forward packets among, a plurality of physical ports.

In one embodiment, the ingress physical ports 140 and the egress physical ports 142 provide multiple 2-way, point-to-point communication links to other devices, such as bridges, other switches in the switching system, endpoints, etc.

The packet processing pipeline 120 generally transfers packets of data from the ingress physical ports 140 to appropriate egress physical ports 142, in an embodiment. In some embodiments, at least some physical ports are input/output ports, and at least some ingress physical ports 108 and egress physical ports 116 correspond to the same physical ports.

According to an embodiment, the ingress portion 144 assigns an eport to an ingressing packet. At least in some scenarios, the ingress portion 144 also assigns an eVLAN to the ingressing packet. The ingress portion 104 also assigns attributes to the packet based on the eport and/or the eVLAN. In some embodiments and scenarios, the eport and/or the eVLAN are reassigned as the packet is processed by the ingress portion 144. In some embodiments and scenarios, the egress portion 146 also assigns attributes to the packet based on the eport and/or the eVLAN. The assigned attributes are utilized by units of the pipeline 120 to determine how the packet is to be processed, for example. For example, determining whether to forward, trap, or mirror a packet is based on an attribute assigned based on an eport and/or an eVLAN (i.e., based on an eport, where the number of eports exceeds the number of physical ports of the FCF 130; and/or based on an eVLAN, indicative of a group of eports, where the number of possible eVLANs exceeds the maximum number of VLANs capable of being represented by a 12-bit VLAN identifier (VID) specified in the Institute for Electrical and Electronics Engineers (IEEE) 802.11Q Standard), in an embodiment. As another example, a source address of a packet is learned or learning of the source address is disabled based on an attribute assigned based on an eport and/or an eVLAN, in an embodiment.

The packet processing pipeline 120 includes a mapping unit 150 at least partially distributed amongst a plurality of processing units, in an embodiment. In another embodiment, the packet processing pipeline 120 includes a plurality of mapping units 150 each associated with a different unit in the pipeline 120. The mapping unit 150 generally provides a mapping function, such as mapping IP addresses, MAC addresses, physical ports, etc., to eports, and vice versa. In some embodiments, the mapping function performed by the mapping unit 150 is different according to the unit in or with which the mapping block 150 is implemented and/or operating.

In the example of FIG. 3, the ingress portion 144 includes a port media access control (MAC) receiver unit 152 coupled to the ingress physical ports 144. The port MAC receiver unit 152 generally implements media access control functions. The port MAC receiver unit 152 also generally interfaces the ingress portion 144 with a particular physical ingress port of the FCF 130 (i.e., if the FCF 130 includes a plurality of physical ingress ports, the FCF 130 includes a plurality of respective port MAC receiver units 152). In another embodiment, one port MAC receiver unit 152 interfaces the ingress portion 144 with a plurality of physical ingress ports (not shown for purposes of clarity) of the FCF 130.

A header decode unit 154 is coupled to the port MAC receiver unit 152 and generally decodes the header of each packet received via the ingress physical ports 140. This may include parsing or identifying different segments of the header for use by subsequent units in the ingress portion 144 and, optionally, units in the egress portion 146. In one embodiment in which the FCF 130 is one of a plurality of switches in a switching system, at least some packets may include a distributed switching architecture (DSA) tag in a header of the packet. The DSA tag includes information used by the switching system to forward the packet through the switching system. The DSA tag is included in a header of the packet by a source switch device in the switching system, and is removed from the packet by a target switch device in the switching system before or as the packet egresses the switching system. In one embodiment, the DSA tag includes indications of one or more of i) a source device (i.e., a source switch device in the switching system), ii) a target device (i.e., a target switch device in the switching system), iii) a physical source port, iv) a physical target port, etc. In one embodiment, the DSA tag additionally or alternatively includes indications of one or more of i) a source eport, ii) a target eport, iii) an eVLAN, iv) an index indicating a list of eports and/or v) an index indicating a list of physical ports to which the packet should be replicated (referred to herein as eVIDX and VIDX, respectively), etc. As will be described in more detail below, when a packet is to be broadcast, multicast, flooded, etc., for example, a replication unit of the FCF 130 utilizes the VIDX to determine how many copies of a packet to create, and to determine the physical ports to which the copies should be passed. Similarly, when a packet is to be broadcast, multicast, flooded, etc., for example, a replication unit of the FCF 130 utilizes the eVIDX to determine how many copies of a packet to create, and to determine the eports to which the copies should be passed.

In an embodiment, the header decode unit 154 also includes the descriptor modification unit 128, as depicted in FIG. 3. Alternatively, the descriptor modification 128 is distributed throughout and/or among one or more other processing units, or is a separate unit in the ingress portion 144. The descriptor modification unit 128 is configured to add or modify a descriptor associated with a packet in the packet processing pipeline 120 and, in particular, to extract destination information from a packet conforming to an emerging protocol that is not recognized or supported by a previous version of the packet processing pipeline that does not have the modification unit 128. For example, in an embodiment depicted by FIG. 3, the descriptor modification unit 128 extracts from an FCoE packet and, in particular, a Fibre Channel header, a destination ID (D_ID) field. The descriptor modification unit 128 uses the extracted destination information to generate new destination information that conforms to a protocol recognized by one of the processing units, and that will cause the processing unit to make a forwarding decision that corresponds to the intended path of the FCoE packet. For example, in an embodiment, the descriptor modification unit 128 generates a descriptor complying with a format recognized by a TRILL engine 155, and/or by a policy engine 158 (especially a policy engine configured to make forwarding decisions), and/or by a bridge engine 160, and/or by a router engine 162.

As seen in FIG. 3, in an embodiment, a MAC2ME & TTI classification unit 156 is coupled to the header decode unit 154. The MAC2ME & TTI classification unit 156 generally performs several functions. First, the MAC2ME & TTI classification unit 156 assigns a source eport to each packet. In an embodiment, assigning a source eport comprises including a source eport indicator in a packet descriptor for the packet. In some embodiments, the MAC2ME & TTI classification unit 156 reassigns a different source eport to the packet in some circumstances. In one embodiment, an eport is a 20-bit value that indicates a physical port or a virtual port, the latter of which is also referred to herein as an Egress Virtual Interface. In other embodiments, the eport is represented by a different suitable number of bits. In one embodiment in which the FCF 130 is one of a plurality of switches in a switching system, the eport is unique to the FCF 130 but is not unique with respect to other switches in the system. In some embodiments and scenarios, one or more eports are unique with respect one or more other switches in the system.

Second, the MAC2ME & TTI classification unit 156 assigns an eVLAN to at least some packets. In an embodiment, assigning an eVLAN comprises including an eVLAN indicator in the packet descriptor for the packet. In at least some instances when the packet already includes a VLAN identifier (VID), such as an IEEE 802.1Q VID, assigning the eVLAN is based on the VID in the packet. In some instances, the MAC2ME & TTI classification unit 156 assigns the eVLAN when the packet does not include a VID. In an embodiment and in some situations, assigning the eVLAN is based on a MAC source address in a packet header and, optionally, other information. In one embodiment, the eVLAN is a 16-bit value.

In other embodiments, the eVLAN is represented by a different suitable number of bits.

Assignment of the eVLAN is based on one or more factors. For example, if the packet includes a DSA tag having a VID, assignment of the eVLAN is based on the VID in the DSA tag, in an embodiment. In some embodiments, assignment of the eVLAN is based on the source physical port and/or the source eport. If the packet includes a VID (e.g., an IEEE 802.1Q VID), assignment of the eVLAN is based on the VID, in an embodiment and at least in some circumstances. In an embodiment, even if the packet includes a VID (e.g., an IEEE 802.1Q VID), assignment of the eVLAN is not based on the VID, at least in some circumstances. In some embodiments, assignment of the eVLAN is based on a tunneling interface.

Third, the MAC2ME & TTI classification unit 156 generally performs two lookup functions. In a first lookup function (a MAC2ME lookup), packets that are destined to a MAC address, VLAN pair recognized by the FCF 130 are identified. This identification may be used in one or more subsequent functions or pipeline units. A second lookup function (a tunnel termination and interface assignment (TTI) lookup) is used for tunnel termination identification and interface assignment, reassigning the eport (as discussed above), and/or assigning the eVLAN (as discussed above) according to L2 or L3 header fields.

In an embodiment, the TTI lookup includes using fields of the header of the packet being processed and other information (such as the result of the MAC2ME lookup) as a lookup key to retrieve data from one or more tables. The table data includes indications of actions to be taken, in an embodiment. In some situations, the TTI lookup indicates that the packet is associated with one or more TTI actions, such as reassigning the eport, assigning the eVLAN, assigning quality of service (QoS) parameters, assigning an egress eport, etc., to the packet, in an embodiment.

In one embodiment, the MAC2ME & TTI classification unit 156 includes a TRILL engine 155 configured to operate according to the Transparent Interconnect of Lots of Links (TRILL) protocol set forth in the Request for Comments (RFC) 556 from the Internet Engineering Task Force (IETF), dated May 2009. In one embodiment and in some situations, the TRILL engine 155 reassigns a different eport to the packet. In one embodiment, an FCoE packet descriptor is processed by the TRILL engine 155 after the descriptor modification unit 128 generates a TRILL compliant descriptor that is recognizable by the TRILL engine.

In an embodiment, the MAC2ME & TTI classification unit 156 utilizes one or more tables, databases, and/or other data library maintained in one or more memory components (such as a TCAM). The one or more tables, databases, etc., are consulted to identify a table entry or database record that matches, or closely approximates, the format and structure of the ingressed packet, in an embodiment. The identified table entry or database record includes an index that is employed to retrieve an action entry from a separate memory, such as a static random access memory (SRAM), in an embodiment; additionally, instructions are retrieved regarding how to process the packet in accordance with such information. In other embodiments, separate memories as discussed above are not utilized. Rather, a single table is accessed to retrieve necessary or desired information regarding a packet based upon some or all of the information described above with reference to constructing keys. In another embodiment, the data library and separate memory discussed above are integrated into a single block (such as a table) having different logical memory areas in some implementations.

As discussed above, the MAC2ME & TTI classification unit 156 assigns an egress eport to at least some packets in response to a TTI lookup in an embodiment. On the other hand, in some embodiments, the MAC2ME & TTI classification unit 156 does not assign an egress eport to at least some packets in response to the TTI lookup. In an embodiment, assigning an egress eport comprises including an egress eport identifier in the packet descriptor for the packet. In one embodiment, the MAC2ME & TTI classification unit 156 assigns an eVIDX to at least some packets in response to a TTI lookup in an embodiment. On the other hand, in some embodiments, the MAC2ME & TTI classification unit 156 does not assign an eVIDX to at least some packets. In an embodiment, assigning an eVIDX comprises including an eVIDX identifier in the packet descriptor for the packet.

An ingress policy engine 158 is coupled to the MAC2ME & TTI classification unit 156. The ingress policy engine 158 generally performs flow classification. A flow corresponds to related series of packets, and may be defined in a variety of different ways. One example of a flow is defined by a source MAC address or a particular destination MAC address in a medium access control (MAC) header. In other words, in one example, all packets having a particular source MAC address correspond to a particular flow. Another example of a flow is defined by a source MAC address/destination MAC address pair. For instance, in one example, all packets having both a particular MAC source address and a MAC destination address correspond to a particular flow. Yet another example of a flow is defined by one or both of a destination ID and a source ID (S_ID) in a Fibre Channel header of a FCoE. Still another example of a flow is defined by one or both of a destination MAC address and a source MAC address of an Ethernet header of a FCoE packet. Additionally, fields from different protocol layers may be combined to define a flow, in some embodiments. For example, in an embodiment, a flow is defined by a destination MAC address of the Ethernet header of a FCoE packet and by a source ID in the Fibre Channel header of the FCoE packet. The ingress policy engine 158 attaches or otherwise associates a flow identifier (ID) to/with a packet to indicate a flow to which the packet belongs, in an embodiment. In at least some scenarios and implementations, the flow ID is removed from the packet before or upon egress from the FCF 130. For example, if the FCF 130 is a component of a switching system including other similar network devices (not shown), and if the packet is exiting the switching system, the flow ID is removed from the packet before or upon egress from the FCF 130, in an embodiment. On the other hand, if the FCF 130 is a component of a switching system including other similar network devices (not shown), and if the packet is being forwarded to another network device in the switching system, the flow ID is included in a DSA tag of the packet before or upon egress from the FCF 130, in an embodiment. In some instances, the ingress policy engine 158 assigns an eVLAN to a packet, according to an embodiment.

In an embodiment, the ingress policy engine 158 includes, or is coupled to, a TCAM or other suitable memory. The ingress policy engine 158 generally uses selected fields of the header of the packet, or of the packet descriptor, being processed, and other information such as the source eport, as a key to the TCAM. An entry in the TCAM indicates a particular rule or set of one or more actions to be performed (with regard to flow measurement, eVLAN assignment, egress eport assignment, etc., for example). In some scenarios, at least some of the actions to be performed are to be performed by processing units downstream from the ingress policy engine 158. Thus, in some scenarios, the ingress policy engine 158 assigns attributes to the packet to indicate to downstream processing units how the packet is to be processed. In an embodiment, assigning an attribute comprises including an attribute indicator in the packet descriptor for the packet. The ingress policy engine 158 also includes, or is coupled to, one or more other memories, such as an SRAM or other suitable memory, in an embodiment. In this embodiment, an entry in the TCAM of the policy engine 158 indirectly indicates a rule or set of one or more actions to be performed, and determining a rule or action to be performed utilizes the one or more additional memory components such as the SRAM. For example, an entry in the TCAM may point or otherwise correspond to a particular location in the SRAM that includes information that in turn indicates a particular rule or set of one or more actions to be performed. The ingress policy engine 158 utilizes the result of the MAC2ME lookup of the MAC2ME and TTI classification unit 156, in an embodiment. For example, the result of the MAC2ME lookup is used as part of the key for the TCAM lookup, in an embodiment.

In an embodiment, a bridge engine 160 is coupled to the ingress policy engine 158. The bridge engine 160 includes, or is coupled to, a forwarding database (not shown that includes MAC destination addresses and indications of the corresponding egress eports to which packets having the MAC destination addresses should be forwarded. In one embodiment, the forwarding database includes a table of MAC destination addresses and indications of the corresponding egress eports. In an embodiment, the forwarding database more generally includes both MAC source addresses and MAC destination addresses, and provides a binding of a MAC address to an eport and other parameters, such as one or more of a flag indicating whether a packet is to be mirrored by the ingress portion 144 to an ingress analyzer (not shown) for further processing, a flag indicating whether a packet is to be mirrored by the egress portion 146 to an egress analyzer (not shown) for further processing, user defined bits to be used for user-defined functions, etc. These bindings are used mainly for forwarding decisions, but are for other purposes as well, such as for mirroring packets to an analyzer for further analysis, user defined functions or applications, etc. The bridge engine 160 performs MAC source address lookups and MAC destination address lookups, in some embodiments and in at least some scenarios.

In an embodiment, the bridge engine 160 generally uses Layer-2 information to determine on which eport or eports a packet should be forwarded. Determination of whether, and to where, a packet should be forwarded, is done by examining the MAC destination address of the packet and determining to which network segment the destination address corresponds using the forwarding database, in some instances. Also, other information is utilized as well in other embodiments and/or instances. For example, eVLAN information is utilized in some embodiments and/or instances. For instance, the bridge engine 160 is capable of determining eport destinations for Layer-2 multicast or broadcast packets using eVLAN information, in some embodiments. The bridge engine 160 also maintains the forwarding database, in some embodiments. For instance, the bridge engine 160 learns an eport to which a source MAC address of an ingressing packet corresponds by recording the eport corresponding to the ingressing packet and associating the eport with the source MAC address of the packet, in an embodiment. In another example, the bridge engine 160 learns an eport to which an eVLAN of an ingressing packet corresponds by recording the eVLAN corresponding to the ingressing packet and associating the eport with the eVLAN of the packet, in an embodiment.

In general, the forwarding database correlates several variables useful for making forwarding decisions. The forwarding database comprises entries based upon eVLAN, eport, and MAC address, for instance; lookup operations based upon MAC address and eVLAN are useful in bridging operations, for example. The bridge engine 160 makes forwarding decisions also using information provided by the MAC2ME & TTI classification unit 156, in an embodiment. Thus, the forwarding database records or table entries include fields associated with one or more of destination MAC address, eport, eVLAN, etc.

In an embodiment, when a packet is to be flooded (e.g., when there is not a match in the forwarding database with the destination MAC address), or when the packet is a multicast or broadcast packet, the bridge engine 160 determines a set of one or more eports to which the packet is to be forwarded. An indicator (referred to herein as "eVIDX") of the determined set of one or more eports is included in or attached to a descriptor associated with the packet, or the indicator of the determined set of one or more ports is attached to the packet for use by subsequent units of the pipeline 120. In one embodiment, eVIDX is used to index a Layer-2 duplication table, wherein each entry in the Layer-2 duplication table includes a pointer to a linked list of eports. In some embodiments, eVIDX is a 16-bit index. In one embodiment, if eVIDX is less than 4K, the eVIDX is interpreted as an indicator of a physical port list. In this embodiment, if eVIDX is greater than or equal to 4K, the eVIDX is interpreted as an indicator of an eport list.

In one embodiment, the bridge engine 160 maintains the Layer-2 duplication table.

The bridge engine 160 receives a packet or packet descriptor formatted as an Ethernet packet (or descriptor), but which did not, as it entered the pipeline 120 conform to the Ethernet protocol, in an embodiment. The packet or descriptor includes, in place of a MAC destination address, a value that will cause the bridge engine 160 to make a forwarding decision in accordance with the packet's original destination. In the described example, the bridge engine 160 receives a packet descriptor, associated with a FCoE packet, that has been modified by the descriptor modification unit 128. The descriptor received by the bridge engine 160 includes, in place of a MAC address, a value associated with the destination ID field of the FCoE packet. In an embodiment, the bridge engine 160 receives a descriptor that includes, in place of the MAC address, the value associated with the destination ID field of the FCoE packet, concatenated with a user-configurable constant. In an embodiment, the descriptor also includes, in place of a VLAN ID (VID), a virtual fabric ID (VF_ID) value associated with a virtual fabric tagging (VFT) field.

A router engine 162 is coupled to the bridge engine 160, in an embodiment. If a received packet is not destined for a network to which the FCF 130 is connected, then routing based on an Internet Protocol (IP) address is performed, in some embodiments and/or scenarios. The router engine 162 includes, or is coupled to, a routing information database (not shown) that includes information corresponding to where IP packets should be forwarded. The router engine 162 generally determines where a received IP packet should be routed, which includes determining the egress eports to which the packet should be forwarded. Determining where a received IP packet should be routed includes examining the IP destination address of the packet and routing information stored in the routing information database. The router engine 162 also maintains the routing information database. Additionally, the router engine 162 determines destinations for IP multicast packets, in some embodiments. In one embodiment, the router engine 162 utilizes a Layer-3 duplication table, wherein each entry in the Layer-3 duplication table is a linked list of eports. In one embodiment, the router engine 162 maintains the Layer-3 duplication table. In one embodiment, the router engine 162 assigns an eVLAN and/or an eVIDX to a multicast packet to indicate the eports to which the packet is to be duplicated.

The IP router engine 162 receives a packet or packet descriptor formatted as an IP packet (or descriptor), but which did not, as it entered the pipeline 120 conform to the Internet Protocol, in an embodiment. The packet or descriptor includes, in place of a destination IP address, a value that will cause the IP router engine 162 to make a forwarding decision in accordance with the packet's original destination. In the described example, the IP router engine 162 receives a packet descriptor, associated with a FCoE packet, that has been modified by the descriptor modification unit 128. The descriptor received by the IP router engine 162 includes, in place of an IP destination address, a value associated with the destination ID field of the FCoE packet and, in particular, of the Fibre Channel header. In an embodiment, the IP router engine 162 receives a descriptor that includes, in place of an IP source address, a value associated with a source ID field of the FCoE packet and, in particular, of the Fibre Channel header. In an embodiment, the descriptor also includes a virtual routing and forwarding (VRF) ID (VF_ID) value associated with an extended header of the FCoE packet. The extended header includes a virtual fabric tagging (VFT) field, in an embodiment.

The ingress portion 144 of the processing pipeline 120 also includes, among other units, such as, in some embodiments, an ingress policer unit, a Layer-3 replicator unit, and a Layer-2 replicator unit, a pre-egress engine 164. The pre-egress engine 164 consolidates decisions of previous units in the ingress portion 144 into a single decision, and updates the descriptor of the packet accordingly.

The egress portion 146 is coupled to the pre-egress engine 164, in an embodiment. In one embodiment and in some scenarios, the pre-egress engine 164 determines one or more physical targets corresponding to the one or more target eports to which a packet is to be forwarded when the target device for the packet is the FCF 130. A physical target could be a physical port/device pair, a trunk, a tunnel start, a list of physical ports, etc. The pre-egress engine 164 includes a portion of the mapping unit 150, and the mapping unit 150 implements a determination of the one or more physical targets corresponding to each target eport to which a packet is to be forwarded, in an embodiment. In one embodiment and in at least some scenarios in which an eport is to be mapped to a plurality of physical ports, the eport is mapped to a VIDX which indicates the plurality of physical ports.

The egress portion 146 of the processing pipeline 120 includes, depending on the embodiment, a plurality of other units including an egress filtering unit, an L2 bridged MC replicator unit, a TXQ and port rate shaping unit, a scheduling unit, an egress policy engine unit, an egress policer unit, and a port MAC TX unit.

In some embodiments, the egress portion 146 of the processing pipeline 120 also includes a header alteration unit 166. In one embodiment, the header alteration unit 166 is coupled to the scheduling unit. In some scenarios, an ingressing packet has a VLAN field and MAC field in the packet header, and in some scenarios, it is necessary to modify the VLAN field (e.g., depending upon the VLAN associated with the MAC DA) or to multicast the packet to destination devices in different VLANs. It is noted that modification of a packet header may occur upon ingress to the provider network or upon egress from the provider network. The header alteration unit 166 may maintain information allowing a packet header to be appropriately manipulated to facilitate such multicast operations. In some implementations, the header alteration unit 166 manipulates the packet header independently or in cooperation with other units of the egress portion 146. The header alteration unit 166 enables control of tagging for customer networks or other subnetwork implementations, in some embodiments. To support this functionality, the header alteration unit 166 is embodied in or comprises a lookup table, database, or other suitable data structure correlating packet attribute information, eVLANs, VIDs, MAC addresses, and customer VLAN tagging preferences. Additionally, the header alteration unit 166 points to a tunnel start entry that provides information regarding the required external header for a packet, in some scenarios; in that regard, a tunnel start entry defines a tunnel to be used to transmit the packet across a provider network.

In some embodiments, the header alteration unit 166 adds one or more headers to the packet.

An egress policy engine 168 is coupled to the header alteration unit 166. The egress policy engine 168 generally performs flow classification. When the packet belongs to a recognized flow, the egress policy engine 168 associates the packet with the flow. For example, the egress policy engine 168 attaches a flow identifier (ID) to a packet to indicate a flow to which the packet belongs, in an embodiment. In at least some scenarios and implementations, the flow ID is removed from the packet before or upon egress from the FCF 130. For example, if the FCF 130 is a component of a switching system including other similar network devices (not shown), and if the packet is exiting the switching system, the flow ID is removed from the packet before or upon egress from the FCF 130, in an embodiment. On the other hand, if the FCF 130 is a component of a switching system including other similar network devices (not shown), and if the packet is being forwarded to another network device in the switching system, the flow ID is included in a DSA tag of the packet before or upon egress from the FCF 130, in an embodiment.

Figure 4:
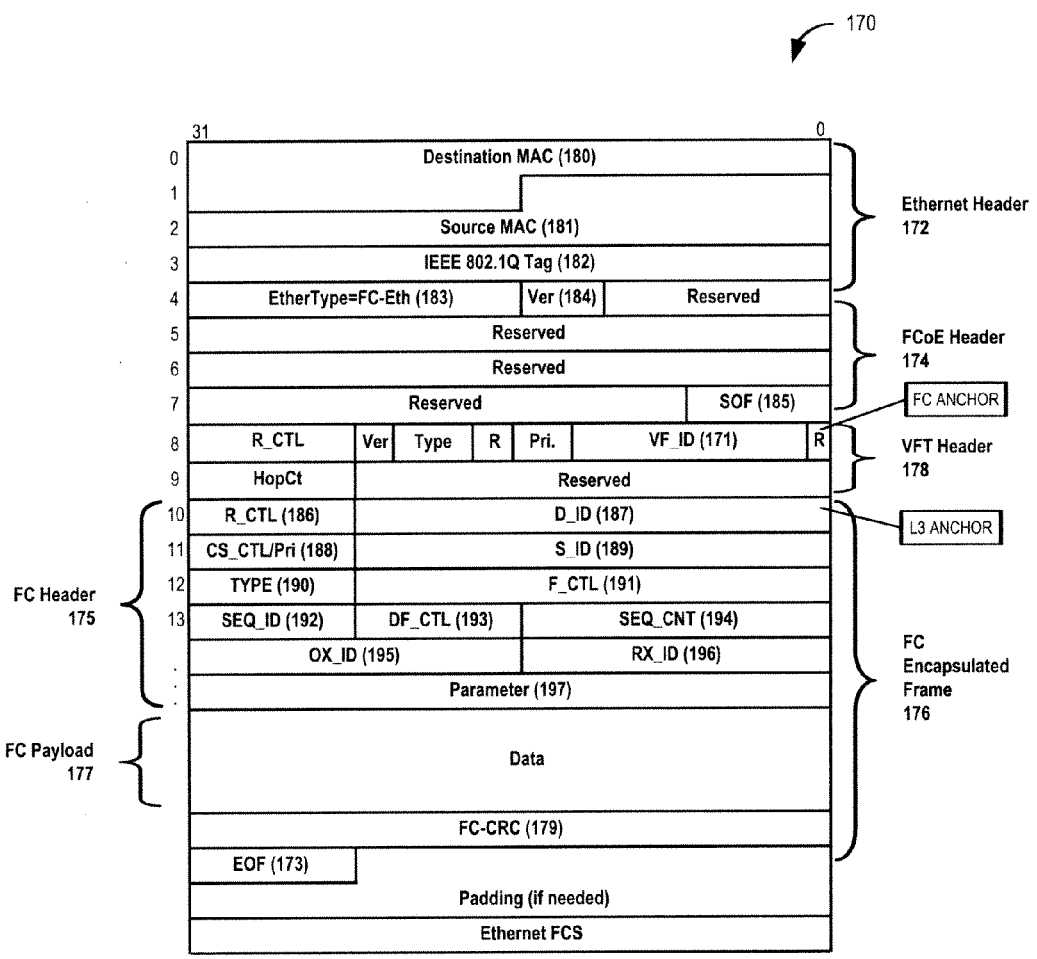
FIG. 4 depicts an embodiment of an FCoE data packet.

Operation of the described methods and apparatus will now be described with reference to one particular example in which the FCF 130 forwards a FCoE packet. The processing pipeline 120 in the FCF 130 is not designed in contemplation of the FCoE protocol and, accordingly, none of the processing units (e.g., 155-162) is designed to process an FCoE packet. FIG. 4 depicts an FCoE packet 170. The FCoE packet 170 includes a standard Ethernet header 172, an FCoE header 174, and an FC encapsulated frame 176. The FCoE packet 170 may also include zero or more optional, extended headers, such as a Virtual Fabric Tagging (VFT) extended header 178.

It is noted that the VFT header 178 is used to implement a Virtual Fabric topology in a Fibre Channel network. Such a topology provides a means for FC frames to be tagged with the Virtual Fabric Identifier (VF_ID) a particular Virtual Fabric to which the FC frame belongs. To that end, the VFT header 178 includes a VF_ID field 171.

As generally known, the Ethernet header 172 includes a Destination MAC address field 180 and a Source MAC address field 181. In an embodiment, the Ethernet header 172 also includes a four-byte IEEE 802.1Q Tag field 182 that itself includes a VLAN identifier (not shown) (VID). The Ethernet header 172 also includes an EtherType field 183, in an embodiment.

The FCoE header 174 includes a header version field 184, a plurality of reserved bits, and a start-of-frame (SOF) field 185. The FC encapsulated frame 176 follows the FCoE header 174, in an embodiment. The FC encapsulated frame 176 includes an FC header 175, an FC payload 177, and an FC cyclical redundancy check (CRC) 179. An end-of-frame (EOF) field 173 ends the FC encapsulated frame 176.

The FC header 190 includes a routing control field (R_CTL) 186, a Destination ID field (D_ID) 187, a class specific control/priority field (CS_CTL/Pri) 188, a Source ID field (S_ID) 189, a type field 190, a frame control field (F_CTL) 191, a sequence ID field (SED_ID) 192, a data field control field (DF_CTL) 193, a sequence count field (SE-Q_CNT) 194, an originator exchange ID field (OX_ID) 195, a responder exchange ID field (RX_ID) 196, and a parameter field 197.

Each of the D_ID field 187 and the S_ID field 189 is a 24-bit field defined in the FC standard. The D_ID and S_ID fields 187, 189 each include an 8-bit Domain_ID sub-field (D_ID.Domain_ID), an 8-bit Area_ID sub-field (D_ID.Area_ID), and an 8-bit Port_ID (D_ID.Port_ID) sub-field. Each switch in a FC network, including the FCF 130, is assigned a specific Domain_ID. When a packet reaches a switch having a Domain_ID matching the Domain_ID sub-field of the packet's D_ID field 187, this indicates that the target of the packet is connected to that switch, and the switch uses the Area_ID and the Port_ID sub-fields to determine to which port the switch should forward the packet.

Figure 5:
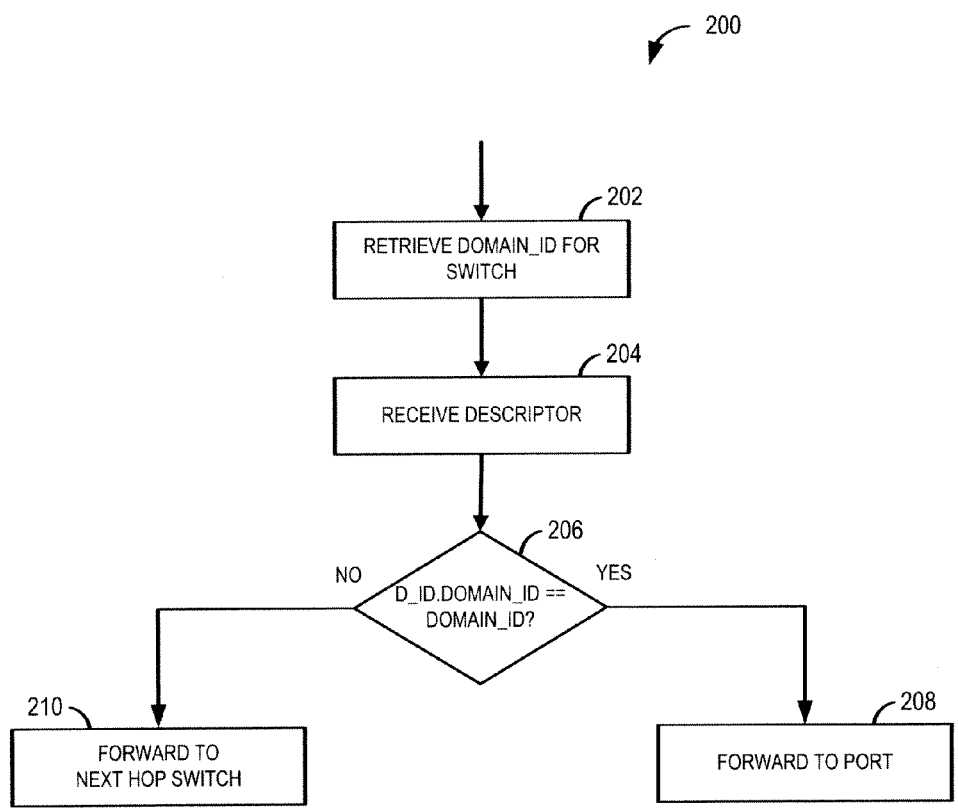
FIG. 5 is a flow diagram of an example method for processing an FCoE packet using an FCoE forwarder device implementing an adapted packet processing pipeline.

FIG. 5 depicts a general method 200, implemented by a switch, for handling FC traffic in an FC or FCoE network. The switch determines its Domain_ID (block 202). The Domain_ID is stored in a memory device of the switch, in some embodiments. The switch receives the packet descriptor (e.g., the packet, one or more headers of the packet, or some portion of the packet) (block 204). In some embodiments, the packet descriptor is stored in a memory device associated with the switch. In any event, the switch compares the Domain_ID of the switch to the Domain_ID sub-field of the D_ID field 187 (block 206) and, if the switch determines that the Domain_ID of the switch is the same as the Domain_ID sub-field of the D_ID field 187, the switch forwards the packet to the destination device according to the Area_ID and Port_ID sub-fields of the D_ID field 187 (block 208). Alternatively, if the switch determines that the Domain_ID of the switch is not the same as the Domain_ID sub-field of the D_ID field 187, the switch forwards the packet to the next hop switch according to the Domain_ID sub-field of the D_ID field 187 (block 210).

Figure 6:
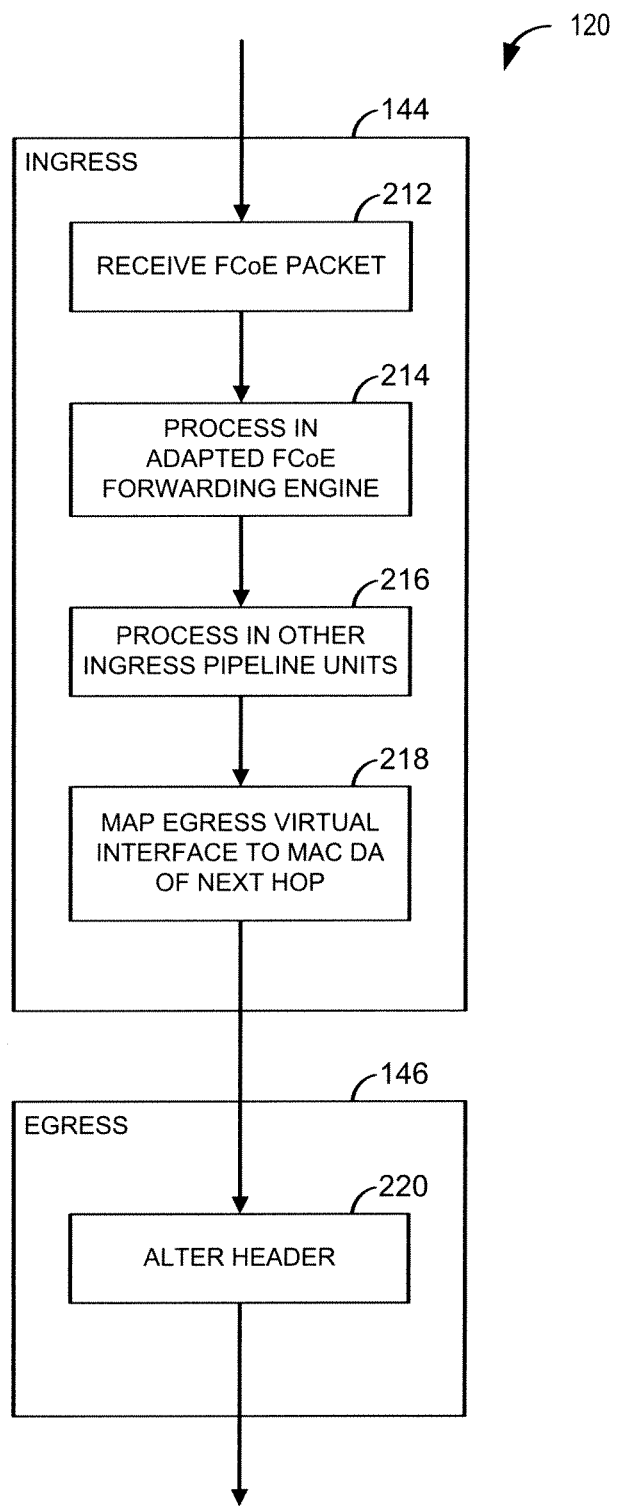
FIG. 6 is a flow diagram depicting the flow of an FCoE data packet through an exemplary adapted packet processing pipeline.

More specifically, the method 200 may be described as including a number of general processes, executed by the pipeline 120. FIG. 6 depicts these general processes in the context of the ingress and egress portions 144 and 146, respectively, of the pipeline 120. In an embodiment, an FCoE data packet arrives at and is received by the switch (block 212). The data packet is received via one of the ingress physical ports 140 and is processed by the port MAC receive unit 152 and the header decode unit 154, in the embodiment. The header decode unit 154 decodes the header of the packet, parsing and identifying various segments of the packet, including, for example, an Ethernet header, an FCoE header, a VFT header, a TRILL header, etc., to determine how to process the packet. The header decode unit 154 determines that the received packet is an FCoE packet, and forwards the packet to an FCoE forwarding engine, in an embodiment.

The packet is then processed by an adapted FCoE forwarding engine (block 214), as described below. The FCoE forwarding engine performs D_ID lookup to retrieve the D_ID field 187 and maps the D_ID field 187 to the appropriate eport, in one embodiment. The eport corresponds to a physical or virtual egress interface, including a device number and a port number. In one embodiment, the eport (which is part of the "Egress Virtual Interface") includes a flag bit (Modify_MAC_DA) indicating whether or not the MAC destination address needs to be changed before egress, and a flag bit (Modify_MAC_SA) indicating whether the MAC source address needs to be changed before egress. For example, if the packet is destined for a device not connected to the switch (i.e., if the Domain_ID sub-field of the D_ID field 187 is not the same as the Domain ID of the switch) the Modify_MAC_DA flag may be set to indicate that the MAC destination address should be changed to reflect the MAC address of the next hop switch, and the Modify_MAC_SA flag may be set to indicate that the MAC source address should be changed to reflect the MAC address of the current switch. The eport may also represent an index to a MAC destination address table in instances where the Modify_MAC_DA flag is set, in an embodiment.

The FCF 130, however, implements the forwarding engine utilizing at least one of the existing processing units in the pipeline 120 that is adapted to perform the functionality of the forwarding engine. For example, in one embodiment, the FCF 130 implements the functionality of the forwarding engine using the TRILL engine 155. In another embodiment, the FCF 130 implements the functionality of the forwarding engine using the ingress policy engine 158. In still another embodiment, the bridge engine 160 implements the functionality of the forwarding engine. In yet another embodiment, the FCF 130 utilizes the router engine 162 to implement the forwarding engine functionality. In some embodiments, the mapping unit 120 implements a portion of the forwarding engine functionality in cooperation with the TRILL engine 155, the ingress policy engine 158, the bridge engine 160, or the router engine 162.

Using existing mechanisms (e.g., the router engine 162, the bridge engine 160, the ingress policy engine 158, or the TRILL engine 155) to implement the forwarding engine functionality may advantageously provide efficient and scalable mechanisms for adding functionality for a previously unsupported protocol (e.g., FCoE functionality) to a switch without requiring radical reconfiguration of the packet processing pipeline 120. Additionally, by using the existing mechanisms, the necessity of additional large tables may be avoided, for example.

In any event, after the packet has been processed by the adapted FCoE forwarding engine, the packet may be processed by zero, one, or multiple ones of the other engines and/or processing units in the ingress pipeline 144 (block 216). By way of example and not limitation, in an embodiment, a layer 2 replicator replicates packets destined via a flooding mechanism for an indicated MAC address. In another embodiment, a layer 3 replicator replicates packets destined via a flooding mechanism for an indicated IP address. In some embodiments, the pre-egress engine 164 may update a packet descriptor according to decisions and/or actions of one or more previous units.

The Egress Virtual Interface gets mapped to a MAC destination address of the next hop, in cases where the device specified by the D_ID field 187 is not connected to the FCF 130 (block 218). In an embodiment, the Egress Virtual Interface is mapped to the MAC destination address of the next hop according to a MAC DA next hop table. In some embodiments, the pre-egress engine 164 determines one or more physical targets corresponding to the one or more egress virtual eports to which the packet is to be forwarded. A physical target could be a physical port/device pair, such as a next hop FCF 130, a trunk, a tunnel interface, etc. The mapping unit 150 determines the one or more physical targets, in an embodiment. In other embodiments, the header alteration unit 166 of the egress portion 146 maps the Egress Virtual Interface to a MAC destination address of the next hop.

In any event, the packet progresses to the egress portion 146 of the FCF 130, and eventually to the header alteration unit 166. The header alteration unit 166, in an embodiment, updates the MAC destination address 180 field in the Ethernet header 172 of the packet (block 220) based on the mapping of the Egress Virtual Interface to the MAC DA of the next hop (block 218). The header alteration unit 166 may also update the MAC source address 181 to the MAC address of the current switch. Execution of part or all of the header alteration (block 220) may occur, dependent, in some embodiments, on whether, respectively, the Modify_MAC_DA flag and the Modify_MAC_SA flag is set.

Figure 7:
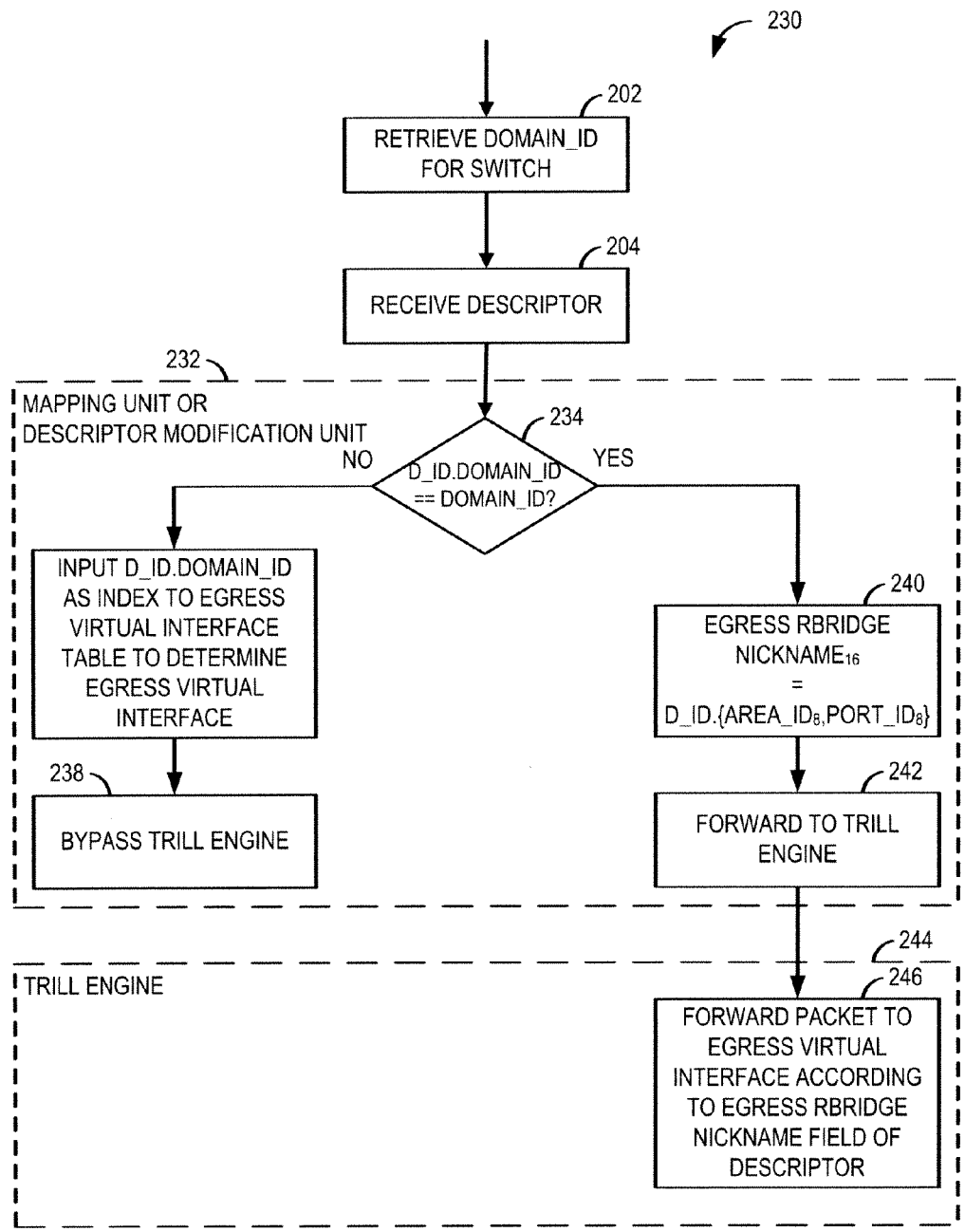
FIG. 7 is a flow diagram of an embodiment of a method for forwarding an FCoE data packet using a TRILL engine in an adapted packet processing pipeline.

An embodiment implementing the forwarding engine using the TRILL engine 155 will now be described with reference to FIG. 7. FIG. 7 shows a method 230 for forwarding FCoE packets using the TRILL engine 155. The method 230 uses a packet descriptor modified to conform to the format of a TRILL header and, in particular, replaces, with information generated using the destination information of the FCoE packet, an egress RBridge nickname field of the TRILL—like descriptor, to forward the packet to the Egress Virtual Interface when the Domain ID of the FCF 130 is the same as the Domain_ID sub-field of the D_ID field 187. As described with reference to FIG. 5, the method 230 includes retrieving the Domain_ID for the FCF 130 (block 202) and receiving the packet descriptor (block 204).

In some embodiments, TRILL engine 155 determines the physical port to which the packet is forwarded. In other embodiments, the TRILL engine 155 determines an Egress Virtual Port (or other suitable virtual interface) to which the packet is forwarded, and the Egress Virtual Port is mapped to a physical port by another unit in the pipeline.

The Domain_ID value assigned to the FCF 130 is then compared to the Domain_ID sub-field of the D_ID field 187 of the FC Frame 175 (block 234). The comparison (block 234) is performed by a mapping unit 232 (such as the mapping unit 150), in some embodiments and, in other embodiments, is performed by the descriptor modification unit 128. In any event, if D_ID.Domain_ID is the same as the assigned Domain_ID value for the FCF 130, the portion of the descriptor or packet corresponding to an egress RBridge nickname field of a TRILL header is modified to according to the Area_ID and Port_ID sub-fields of the D_ID field 187 (block 240), and the descriptor or packet is forwarded to a TRILL engine 244 (block 242), such as the TRILL engine 155 depicted in FIG. 3. The TRILL engine 244 processes the packet having the modified TRILL header as it would process TRILL packets generally, forwarding the packet to an appropriate Egress Virtual Interface according to the data in the descriptor interpreted by the TRILL engine 244 as an egress RBridge nickname (block 246).

Alternately, if D_ID.Domain_ID is not the same as the assigned Domain_ID value for the FCF 130, D_ID.Domain_ID is mapped to an Egress Virtual Interface (block 236) by, for example, using D_ID.Domain_ID as an index to a corresponding Egress Virtual Interface table. The packet then bypasses the TRILL engine 244 (block 238).

In an embodiment, part or all of the mapping or descriptor modification unit 232 is integrated within the TRILL engine 244. In another embodiment, the mapping or descriptor modification unit 232 is independent of the TRILL engine 244.

Figure 8:
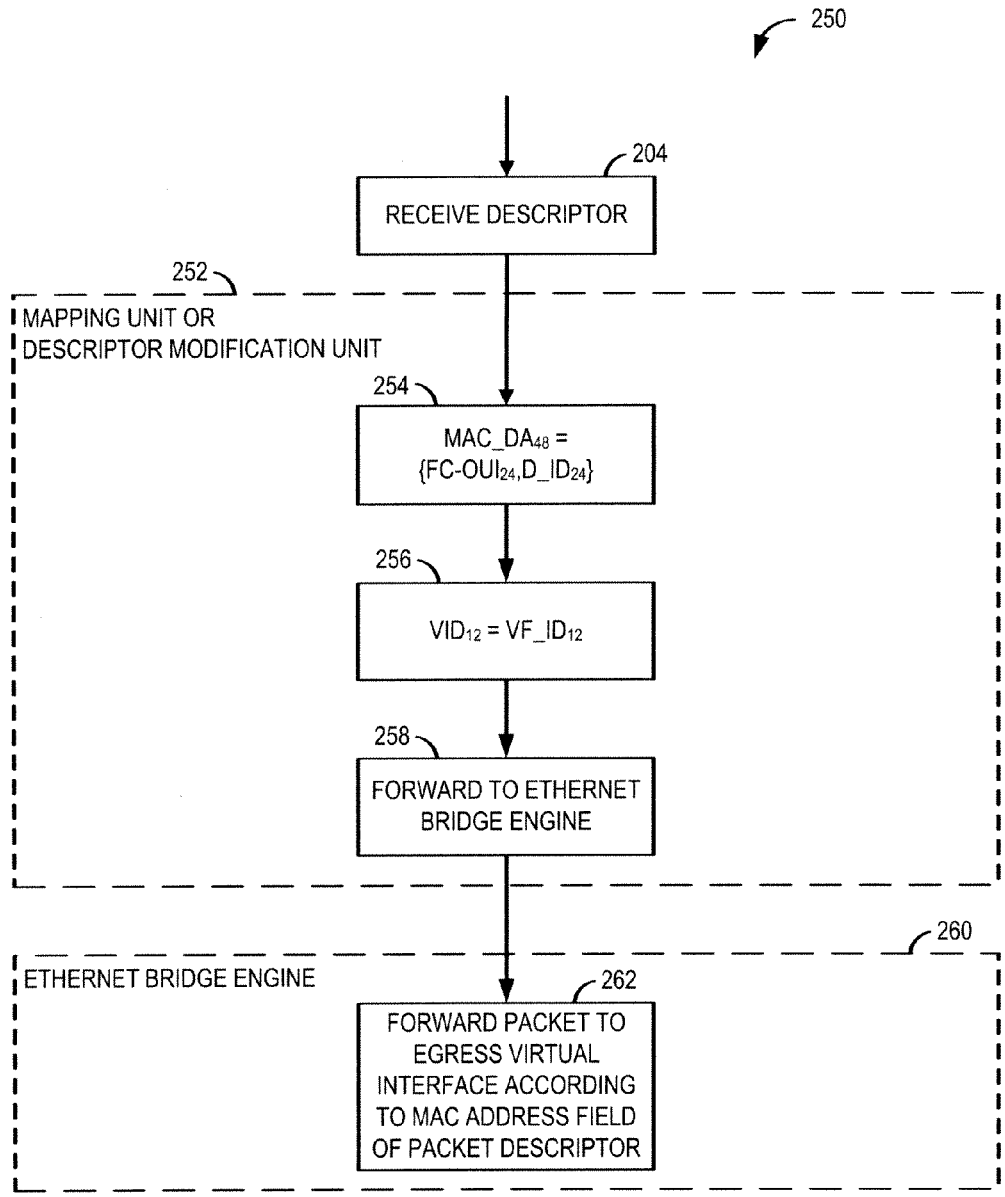
FIG. 8 is a flow diagram of another embodiment of a method for forwarding an FCoE data packet using an Ethernet bridge engine in an adapted packet processing pipeline.

With reference now to FIG. 8, in an embodiment, the FCF 130 implements the forwarding engine using a method 250 that employs the Ethernet Bridge Engine 160 to forward FCoE packets. In an embodiment, the method 250 modifies the FCoE packet descriptor such that it has the characteristics of an Ethernet VLAN packet descriptor. As described with reference to FIG. 5, the method 250 includes receiving the descriptor (block 204). In some embodiments, the method 250 does not include all of the method 200 described in FIG. 5 and, in particular, does not include retrieving the Domain_ID for the FCF 130 (block 202), comparing the Domain_ID for the FCF to the Domain_ID sub-field of the D_ID field 187 (block 206), etc.

Portions of the method 250 are performed by a mapping or descriptor modification unit 252 and an Ethernet Bridge Engine 260, in an embodiment. The mapping or descriptor modification unit 252 may, for example, be the mapping unit 150 or the descriptor modification unit 128 depicted in FIG. 3. In some embodiments, the mapping or descriptor modification unit 252 is implemented wholly or partially in the Ethernet Bridge Engine 260, while in other embodiments, the mapping or descriptor modification unit 252 is self-contained.

As described above, an Ethernet Bridge Engine 260, such as the bridge engine 160, maps MAC destination addresses to the Egress Virtual Interface, and includes a forwarding database that includes MAC destination addresses and indication of the corresponding egress eports to which packets having the MAC destination addresses should be forwarded. In order to implement FCoE forwarding using an Ethernet bridge engine, an incoming packet descriptor is modified to appear to the Ethernet bridge engine 260 as an Ethernet packet by, for example, modifying a portion of the descriptor interpreted by the Ethernet bridge engine 260 as the MAC destination address field 180 to instead reflect the D_ID specified in the D_ID field 187 of the FC frame 176 (block 254). Because the MAC destination address field 180 is a 48-bit field (six pairs of hexadecimal digits) and the D_ID field is a 24-bit field (an 8-bit Domain_ID, an 8-bit Area_ID, and an 8-bit Port_ID), the remaining 24-bits interpreted by the Ethernet bridge engine 260 as the MAC destination address field 180 must be populated with another value or values. In an embodiment, the MAC destination address field 180 of the descriptor is populated with a concatenation of the D_ID field 187 and a 24-bit Organization Unique Identifier (FC_OUI) associated with the Fibre Channel. The FC_OUI is a configurable constant.

If the FCoE packet includes a VFT header (e.g., the VFT header 178 of FIG. 4), the method 250 includes assigning the value of the VF_ID field 171 to the VLAN identifier (VID) in the IEEE 802.1Q tag 182 (block 256), in some embodiments. The packet descriptor is forwarded to the Ethernet Bridge Engine 260 (block 258) for processing. The Ethernet Bridge Engine 260 forwards the packet to the Egress Virtual interface according to the field it interprets as a MAC destination address and the value (if one exists) of the modified VID field (block 262), just as it would do with a standard Ethernet packet descriptor. In an embodiment, the Ethernet bridge engine 260 determines the physical port through which the packet should egress, for example, by performing a lookup.

In another embodiment, the FCoE packet neither includes a VFT header nor a VFT header but does not assign the value of the VF_ID field 171 to the VID. In this embodiment, the Ethernet bridge engine 260 does not consider the value of the descriptor that it interprets as a VID when determining the Egress Virtual Interface.

Figure 9:
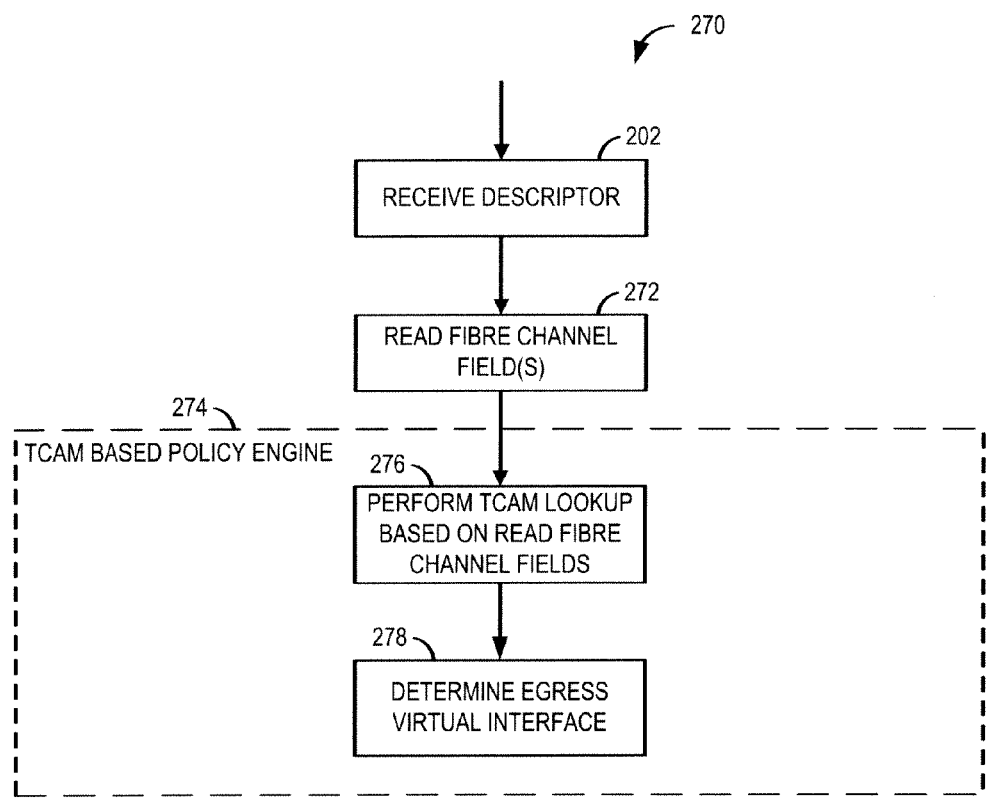
FIG. 9 is a flow diagram of still another embodiment of a method for forwarding an FCoE data packet using a TCAM-based policy engine in an adapted packet processing pipeline.

In an embodiment, the FCF 130 implements the FCoE forwarding engine using a TCAM based policy engine, such as the ingress policy engine 158, in an embodiment. FIG. 9 depicts a method 270 using a TCAM based policy engine 274 for performing FCoE forwarding. As with the previously described FCoE forwarding methods 230 and 250, the method 270 begins with receipt of the packet descriptor (block 202). Fields of interest that are present in the packet descriptor are accessed (block 272) and the policy engine 274 performs a TCAM lookup based on one or more of the fields (block 276). The policy engine 274 determines an Egress Virtual Interface (block 278) according to the results of the TCAM lookup.

The determination of the Egress Virtual Interface (block 278) (i.e., the forwarding decision) is based on a flexible combination of FC fields. In an embodiment, the forwarding decision is based on values of the D_ID field 187 and the S_ID field 189 in the FC header 175, and on the value of the VF_ID field 171 of the VFT header 178. In another embodiment, the forwarding decision is based on the values of the D_ID field 187 and the S_ID field 189 in the FC header 175. In still another embodiment, the forwarding decision is based only on the value of the D_ID field 187.

In addition to the fields described above (e.g., D_ID, S_ID, VF_ID, etc.), some packet descriptors used within the FCF 130 may include User Defined Bytes (UDBs), in an embodiment. The UDBs allow a user of the switch to define, according to specific switching needs, information within the packets. For example, in an embodiment, certain fields are accessed using a UDB as a key to perform a TCAM lookup. Each UDB is associated with one of several previously defined anchors and an offset value relative to the anchor, in an embodiment, and each of the anchors is defined as pointing to a specific point in the packet. For example, and with reference again to FIG. 3, in one embodiment, a packet (which may be stripped to a packet descriptor) is stored in a memory and accessed repeatedly by different ones of the units in the pipeline 120. The header decode unit 154 determines the memory locations where specific parts of the packet reside in the memory and creates pointers to those locations.

In another embodiment, a packet and, in particular, the packet header, is processed by the header decode unit 154 and stored in various memories, each associated with a corresponding various one of the units of the pipeline 120. The header decode unit 154 determines the memory locations where specific parts of the packet reside relative to the start of the packet (i.e., determines, for each of the anchors, an offset from the start of the packet) and stores it as an anchor offset value. Each time the packet is copied into a corresponding memory (e.g., for processing by an additional unit of the pipeline 120), the anchor offset value or values are copied with it, or are referenced by the unit if stored in a single location. The unit then determines the anchor locations in the corresponding memory according to the unit's knowledge of the starting location in memory of the packet. Fields of interest in the packet are then determined using the appropriate anchor or anchors and the offset relative to those anchors. As will be appreciated, in this embodiment, the parts of the packet specified by the UDB are determined by an offset from the anchor offset.

In an embodiment, one or more anchor modes are supported. That is, the header decode unit 154 determines one or more anchor positions for each packet. For example, an L3 anchor always points to the beginning of the FC header 175 (after all extended headers) and an FC anchor always points to the first byte after the FCoE header 174 (see FIG. 3). Thus, if the packet includes extended headers, the FC anchor points to the beginning of the first extended header. In some embodiments, the FCF 130 supports other or different anchor modes that allow flexible parsing of the packet fields of interest.

Figure 10:
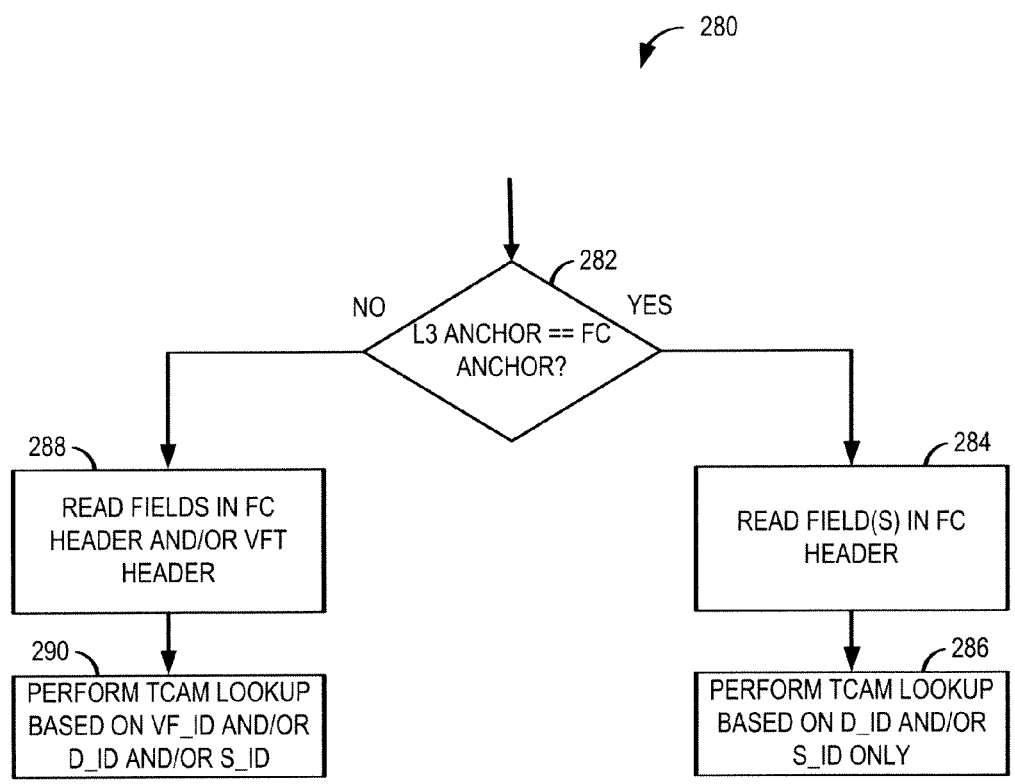
FIG. 10 is a flow diagram of a method for flexibly parsing and retrieving values from the fields of one or more headers of an FCoE data packet.

In this manner, the fields of interest can be accessed regardless of whether the FC frame includes extended headers. That is, in an FC frame that does not include any extended headers (e.g., VFT header 178), the FC anchor and the L3 anchor point to the same location. FIG. 10 depicts a method 280 for parsing packet descriptors to find fields of interest in packets that may or may not include extended headers. The L3 anchor is compared to the FC anchor (block 282). If the L3 and FC anchors point to the same location in memory, fields in the extended headers (e.g., VF_ID 171 in the VFT header 178) are not used to perform TCAM lookup in the policy engine 274, and the policy engine 274 accesses only fields in the FC frame 176 (block 284) (e.g., the D_ID field 187, the D_ID field 187 and the S_ID field 189, etc.) and performs the lookup based on only those fields (block 286). Alternately, in some embodiments, if the L3 and FC anchors point to different locations in memory, fields in the extended headers are used to perform TCAM lookup in the policy engine 274, and policy engine 274 accesses fields in both the FC header 175 and the VFT header 178 (block 288) and performs the TCAM lookup based on the values in those fields (e.g., based on the values of the VF_ID field 171 and of the D_ID field 187) (block 290).

Figure 11:
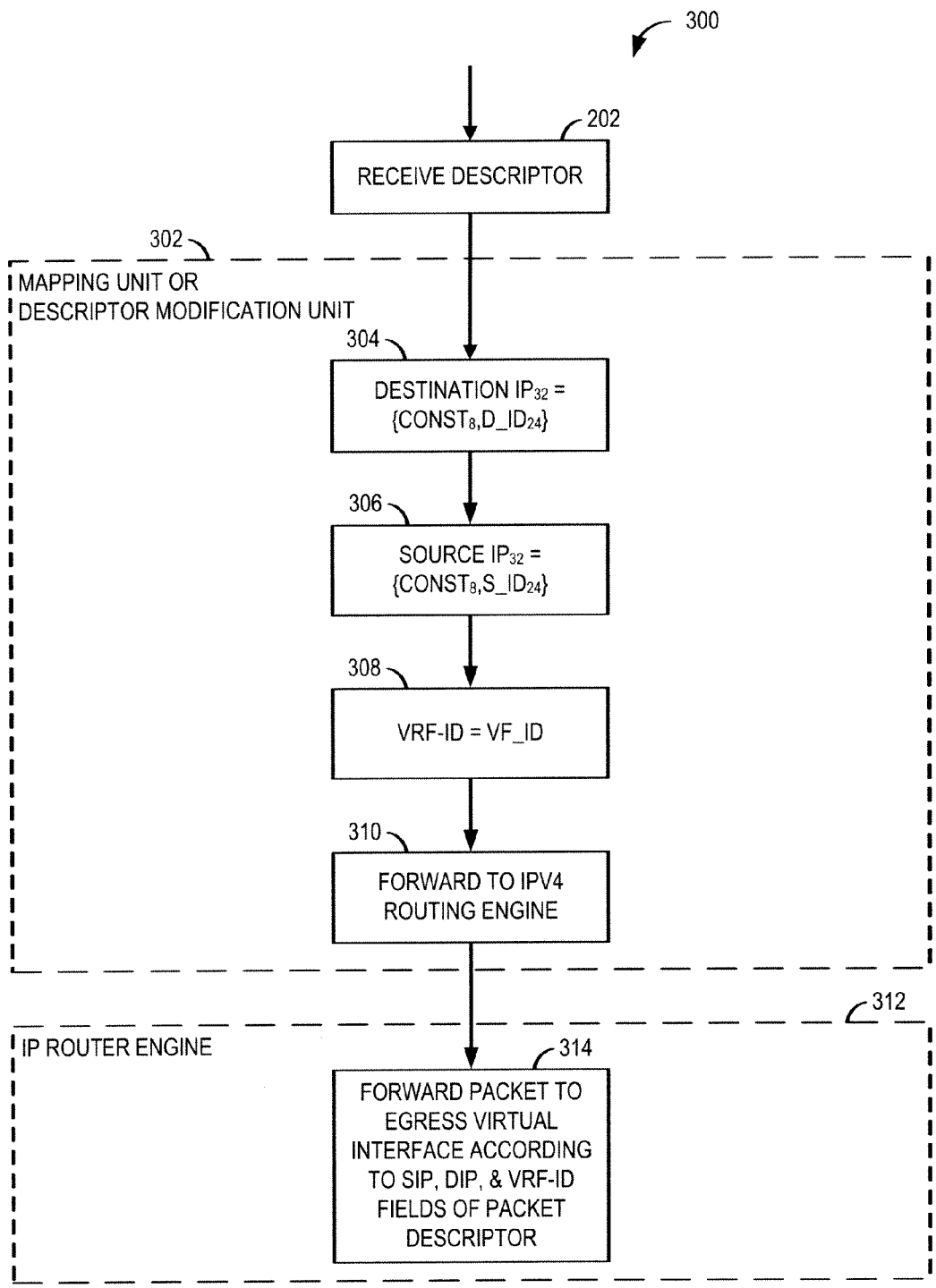
FIG. 11 is a flow diagram of yet another embodiment of a method for forwarding an FCoE data packet using an IP router engine in an adapted packet processing pipeline.

In still other embodiments, one of which is depicted in FIG. 11, the FCF 130 implements various methods that use a mapping or descriptor modification unit 302 coupled to an IP router engine 312 to perform forwarding of FCoE packets. In one of these embodiments, the mapping or descriptor modification unit 302 corresponds to the mapping unit 150 or the descriptor modification unit 128 in FIG. 3 and the IP router engine 312 corresponds to the router engine 162 in FIG. 3. FIG. 11 shows a method 300 for performing FCoE forwarding using the router engine 312. As with the methods 230, 250, and 270, the method 300 begins with receipt of the packet descriptor (block 202).

The descriptor for the FCoE packet is formatted as an IP packet and, in particular, as an IPv4 packet in an embodiment. An IP packet descriptor includes, among other fields, a four-byte source IP address and a four-byte destination IP address. In an embodiment, the IP packet descriptor includes a prefix that includes a Virtual Routing and Forwarding ID (VRF-ID).

The mapping or descriptor modification unit 302 modifies the packet IP-packet-formatted descriptor to map the D_ID field 187 and the S_ID field 189 to the portions of the descriptor interpreted by the IP router engine 312 as the destination IP and the source IP, respectively. Because the D_ID and the S_ID are each 24-bit fields, and the destination and source IP addresses are each 32-bit fields, the mapping or descriptor modification unit 302 maps the D_ID field 187 to the destination IP by concatenating the D_ID field 187 with a first constant (block 304) and maps the S_ID field 189 to the source IP by concatenating the S_ID field 189 with second constant (block 306), in an embodiment. The first constant and the second constant are the same value in an embodiment. In instances where the FCoE packet includes the VFT header 178, the mapping or descriptor modification unit 302 also maps the VF_ID to the VRF-ID (block 308). The packet descriptor is forwarded to the IP router engine 312 (block 310), and the IP router engine 312 makes a forwarding decision for the packet according to the IP protocol, based on portions of the descriptor interpreted by the IP router engine 312 as the source IP address, the destination IP address, and (if present) the VRF-ID (block 314).

In an embodiment, one or both of the portions of the descriptor interpreted by the IP router engine 312 as the source IP and/or the VRF-ID remains unmodified, and the IP router engine 312 makes a forwarding decision based only on the destination IP or on the destination IP and the source IP.

In some embodiments, the IP router engine 312 makes different forwarding decisions for IP traffic than for FCoE traffic. In one embodiment, a dedicated VRF-ID range causes the IP router engine to make a different forwarding decision for FCoE traffic than it does for IP traffic. In another embodiment, a routing table associated with the IP router engine 312 includes, for each routing entry, a flag indicating whether to make a forwarding decision for IP traffic or for FCoE traffic.

The apparatus and method blocks described above may be implemented in hardware, software or firmware, or some combination of hardware, software and/or firmware. When implemented in hardware, the blocks, operations, techniques, etc., may be implemented in, for example, a custom integrated circuit (IC), an application specific integrated circuit (ASIC), a field programmable logic array (FPGA), a programmable logic array (PLA), etc. When implemented in software, the software may be stored in any computer readable memory such as on a magnetic disk, an optical disk, or other storage medium, in a RAM or ROM or flash memory of a computer, processor, hard disk drive, optical disk drive, tape drive, etc.

The present invention may be embodied in any type of router or network bridge device used in a wired and/or wireless communication system including, for example, ones used in communication systems including or coupled to one or more of a wired local area network, a wireless local area network, a wired metropolitan area network, a wireless metropolitan area network, a wired wide area network, a wireless wide area network, a storage area network, the Internet, etc.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for forwarding packets, comprising:
    implementing a packet processor having a plurality of packet processing units for processing packets that are compliant with a recognized communication protocol, the plurality of packet processing units not configured to process packets compliant with an unrecognized communication protocol;
    implementing in the packet processor an adapted processing unit configured to process packets that are compliant with the unrecognized communication protocol;
    receiving, at a port coupled to the plurality of packet processing units, a packet that is compliant with the unrecognized communication protocol, wherein the received packet includes an unrecognized header;
    extracting from the unrecognized header, in the adapted processing unit, first destination information that is compliant with the unrecognized communication protocol;
    generating, using the extracted first destination information, second destination information that is consistent with a protocol supported by at least one of the plurality of processing units for determining an egress interface to which the received packet is to be forwarded;
    determining, using the second destination information in at least one of the processing units not configured to process packets compliant with the unrecognized communication protocol, the egress interface for the packet; and
    forwarding the received packet that is compliant with the unrecognized communication protocol to a particular physical egress port associated with the determined egress interface.

2. The method according to claim 1, wherein generating second destination information comprises generating for use in the processor a descriptor, corresponding to the received packet, that includes the second destination information, wherein the second destination information is compliant with destination information of the recognized protocol.

3. The method according to claim 1, wherein implementing the packet processor comprises implementing at least a ternary content-addressable memory (TCAM) policy engine;
    wherein receiving the packet including the unrecognized header comprises receiving a Fibre Channel over Ethernet (FCoE) packet having a Fibre Channel header, wherein extracting the first destination information comprises extracting information from one or more fields of the Fibre Channel header, and
    wherein generating second destination information comprises applying a multifield key containing the extracted information to the TCAM to obtain destination information, recognized by the policy engine, that allows the policy engine to determine the egress interface.

4. The method according to claim 3, wherein determining the egress interface comprises determining an egress port and a destination media access control (MAC) address.

5. The method according to claim 3, wherein extracting information from one or more fields of the Fibre Channel header comprises extracting a destination ID field associated with the Fibre Channel header.

6. The method according to claim 3, wherein extracting information from one or more fields of the Fibre Channel header comprises extracting at least extracting a value of a field associated with the Fibre Channel header and extracting a value of a field associated with an extended header specifying a Fibre Channel fabric to which the Fibre Channel packet belongs.

7. The method according to claim 6, wherein extracting the value of the field in the Fibre Channel header comprises extracting a value of a destination ID field and wherein extracting a value of a field associated with an extended header comprises extracting a value of a virtual fabric ID (VF_ID) field from a virtual fabric tagging (VFT) header.

8. The method according to claim 6, further comprising detecting the presence of the extended header according to two or more anchors.

9. The method according to claim 3, wherein extracting information from one or more fields of the Fibre Channel header further comprises using an anchor point and an offset to read each of the one or more fields from the received packet.

10. The method according to claim 1, wherein implementing the adapted processing unit comprises modifying one of the plurality of packet processing units to extract the first destination information and to generate the second destination information.

11. The method according to claim 1, wherein implementing the adapted processing unit comprises adding to the packet processor the adapted processing unit configured to extract the first destination information and to generate the second destination information.

12. The method according to claim 1, wherein implementing in the packet processor the adapted processing unit comprises implementing a configurable processing unit adaptable to recognize protocols unrecognized by the plurality of processing units.

13. The apparatus according to claim 1, wherein the unrecognized communication protocol is Fibre Channel over Ethernet (FCoE), wherein receiving the received packet that is compliant with the unrecognized communication protocol comprises receiving an FCoE packet, and wherein forwarding the received packet that is compliant with the unrecognized communication protocol comprises forwarding the FCoE packet.

14. An apparatus for forwarding packets, comprising:
- a hardware packet processor having a processing unit for processing packets that are compliant with a recognized communication protocol, the processing unit not configured to process packets compliant with an unrecognized communication protocol;
- a first port coupled to the packet processor and configured to receive a packet that is not compliant with the recognized communication protocol, the received packet having a packet header conforming to a second communication protocol;
- a data extraction unit configured to extract first destination information from the header of the packet and to generate, using first destination information extracted from the header of the received packet, second destination information that conforms to the recognized communication protocol, wherein the processing unit not configured to process packets compliant with the unrecognized communication protocol determines, based on the second destination information, an egress interface to which the received packet compliant with the unrecognized communication protocol is to be forwarded; and
- a second port associated with the determined egress interface.

15. The apparatus according to claim 14, wherein the data extraction unit is configured to integrate the second destination information into a packet descriptor corresponding to the received packet, the packet descriptor conforming to the recognized communication protocol.

16. The apparatus according to claim 14, wherein the processing unit is a ternary content-addressable memory (TCAM) policy engine, wherein the first port is configured to receive a Fibre Channel over Ethernet (FCoE) packet having a Fibre Channel header, wherein the data extraction unit is configured to generate the second destination information by applying a multi-field key containing the extracted information to the TCAM to obtain destination information, recognized by the policy engine, that allows the policy engine to determine the egress interface.

17. The apparatus according to claim 16, wherein the data extraction unit is configured to determine an egress interface comprising an egress port and a destination media access control (MAC) address.

18. The apparatus according to claim 16, wherein the data extraction unit extracts from the Fibre Channel header a destination ID field associated with the Fibre Channel header.

19. The apparatus according to claim 16, wherein the data extraction unit extracts a value of at least one field associated with the Fibre Channel header and a value of at least one field associated with an extended header.

20. The apparatus according to claim 19, wherein the data extraction unit extracts a value of a destination ID field and a value of at least one field of a virtual fabric tagging (VFT) header.

21. The apparatus according to claim 14, wherein the data extraction unit is distinct from the processing unit.

22. The apparatus according to claim 14, wherein the data extraction unit is a configurable unit adaptable to recognize protocols unrecognized by the processing unit.

* * * * *